United States Patent
Govrin et al.

(10) Patent No.: US 10,387,536 B2
(45) Date of Patent: *Aug. 20, 2019

(54) COMPUTERIZED DATA-AWARE AGENT SYSTEMS FOR RETRIEVING DATA TO SERVE A DIALOG BETWEEN HUMAN USER AND COMPUTERIZED SYSTEM

(71) Applicant: Personetics Technologies Ltd., Tel Aviv (IL)

(72) Inventors: David D. Govrin, Herzeliya (IL); David Sosna, Scarsdale, NY (US); Ido Ophir, Tenafly, NJ (US); Dan Vatnik, Tel-Aviv (IL)

(73) Assignee: PERSONETICS TECHNOLOGIES LTD., New York, NY (US)

( * ) Notice: Subject to any disclaimer, the term of this patent is extended or adjusted under 35 U.S.C. 154(b) by 880 days.

This patent is subject to a terminal disclaimer.

(21) Appl. No.: 14/345,797

(22) PCT Filed: Sep. 19, 2012

(86) PCT No.: PCT/IL2012/050370
§ 371 (c)(1),
(2) Date: Mar. 19, 2014

(87) PCT Pub. No.: WO2013/042115
PCT Pub. Date: Mar. 28, 2013

(65) Prior Publication Data
US 2014/0229405 A1    Aug. 14, 2014

Related U.S. Application Data

(60) Provisional application No. 61/536,142, filed on Sep. 19, 2011.

(51) Int. Cl.
*G06F 17/20* (2006.01)
*G06N 5/04* (2006.01)
(Continued)

(52) U.S. Cl.
CPC ............... *G06F 17/20* (2013.01); *G06N 5/02* (2013.01); *G06N 5/04* (2013.01); *G06Q 40/02* (2013.01);
(Continued)

(58) Field of Classification Search
CPC .......... G06N 5/04; G06N 5/02; G06N 99/005; G09B 7/04; G06F 9/4446
(Continued)

(56) References Cited

U.S. PATENT DOCUMENTS 5,899,972 A    5/1999   Miyazawa
6,021,403 A    2/2000   Horvitz
(Continued)

OTHER PUBLICATIONS

Felzenszwalb et al.—The Generalized A Architecture—http://people.cs.uchicago.edu/~pff/papers/astar.pdf.*
(Continued)

*Primary Examiner* — Scott A. Waldron
*Assistant Examiner* — Viker A Lamardo
(74) *Attorney, Agent, or Firm* — Oliff PLC

(57) ABSTRACT

A system and method for data gathering system, comprising a data-aware knowledge base storing knowledge on relative costs of obtaining various data items; and a data retrieval decision-making processor operative, when an individual data element is sought to be retrieved, to determine whether or not to retrieve the data element by comparing at least one parameter representing need for the data element, also termed herein a utility value, with at least one parameter, retrieved from the data-aware knowledge base, which represents relative cost of obtaining the data element.

20 Claims, 17 Drawing Sheets

(51) Int. Cl.
*G10L 13/08* (2013.01)
*G06N 5/02* (2006.01)
*G06Q 40/02* (2012.01)
*G10L 15/22* (2006.01)

(52) U.S. Cl.
CPC .............. *G10L 13/08* (2013.01); *G10L 15/22* (2013.01); *G10L 2013/083* (2013.01)

(58) Field of Classification Search
USPC .......................................................... 706/11
See application file for complete search history.

(56) References Cited

U.S. PATENT DOCUMENTS

| | | | |
|---|---|---|---|
| 6,505,155 B1 | 1/2003 | Vanbuskirk | |
| 6,711,585 B1 | 3/2004 | Copperman | |
| 6,766,320 B1 | 7/2004 | Wang | |
| 6,947,923 B2 | 9/2005 | Cha | |
| 7,512,940 B2* | 3/2009 | Horvitz | H04L 29/06 717/173 |
| 7,739,215 B2* | 6/2010 | Horvitz | G06F 17/30687 706/46 |
| 8,938,394 B1 | 1/2015 | Faaborg et al. | |
| 8,939,394 B1 | 1/2015 | Faaborg | |
| 9,495,331 B2* | 11/2016 | Govrin | G06Q 40/02 |
| 2001/0015976 A1* | 8/2001 | Harasawa | H04L 45/00 370/391 |
| 2001/0047265 A1 | 11/2001 | Sepe | |
| 2001/0049688 A1 | 12/2001 | Fratkina | |
| 2002/0133392 A1 | 9/2002 | Angel | |
| 2003/0084016 A1* | 5/2003 | Norgaard | G06Q 10/10 706/60 |
| 2003/0191627 A1* | 10/2003 | Au | G06F 17/2785 704/9 |
| 2003/0233230 A1 | 12/2003 | Ammicht | |
| 2005/0086058 A1* | 4/2005 | Lemelson | H04R 5/04 704/270 |
| 2005/0228668 A1 | 10/2005 | Wilson | |
| 2006/0074670 A1 | 4/2006 | Weng | |
| 2006/0167856 A1 | 7/2006 | Angele | |
| 2006/0195463 A1* | 8/2006 | Bogner | G06Q 10/10 |
| 2006/0285657 A1 | 12/2006 | Lippke | |
| 2007/0033038 A1 | 2/2007 | Strong | |
| 2007/0078886 A1 | 4/2007 | Rivette | |
| 2007/0239637 A1 | 10/2007 | Paek | |
| 2008/0097748 A1* | 4/2008 | Haley | G06F 17/2785 704/9 |
| 2008/0221923 A1* | 9/2008 | Shogan | G06Q 50/22 705/2 |
| 2010/0023320 A1 | 1/2010 | Di Cristo | |
| 2010/0220745 A1* | 9/2010 | Lauwers | H04L 41/0896 370/468 |
| 2010/0312547 A1 | 12/2010 | Van Os | |
| 2012/0016678 A1* | 1/2012 | Gruber | G06F 17/3087 704/275 |
| 2014/0222433 A1 | 8/2014 | Govrin | |

OTHER PUBLICATIONS

U.S. Office Action dated Apr. 13, 2016 from corresponding U.S. Appl. No. 14/345,811.
U.S. Office Action dated Nov. 24, 2015 from corresponding U.S. Appl. No. 14/345,811.
U.S. Office Action dated Nov. 23, 2015 from corresponding U.S. Appl. No. 14/345,771.
"Apple introduces us to Siri the Killer Patent", Patently Apple, https://web.archive.org/web/20120501071547/http://www.patentlyapple.com/patently-apple/2012/01/apple-introduces-us-to-siri-the-killer-patent.html, May 1, 2012.
"Free variables and bound variables", from Wikipedia, the free encyclopedia, https://en.wikipedia.org/w/index.php? title=Free_variables_and_bound_variables&oldid=510576259, Sep. 3, 2012.
"Drools", from Wikipedia, the free encyclopedia, https://en.wikipedia.org/w/index.php? title=Drools&oldid=507822378, Aug. 17, 2012.
"Rete algorithm", from Wikipedia, the free encyclopedia, https://en.wikipedia.org/w/index.php? title=Rete_algorithm&oldid=502977832, Jul. 18, 2012.
"Predictive analytics", from Wikipedia, the free encyclopedia, https://en.wikipedia.org/w/index.php? title=Predictive_analytics&oldid=513163651, Sep. 17, 2012.
"Closure (computer programming)", from Wikipedia, the free encyclopedia, https://en.wikipedia.org/w/index.php? title=Closure_(computer_programming)&oldid=512390948, Sep. 14, 2012.
"Spectral graph theory", from Wikipedia, the free encyclopedia, https://en.wikipedia.org/w/index.php? title=Spectral_graph_theory&oldid=505685173, Aug. 4, 2012.
International Search Report and Written Opinion dated Apr. 9, 2013, from the corresponding PCT/IL12/50370.

* cited by examiner

| 1001 | | Card Lost | | | | |
|---|---|---|---|---|---|---|
| RCCardLMisused | | Lost and misused | | | | |

| blockName | name | blockType | type | dialogCode | functionCode | description |
|---|---|---|---|---|---|---|
| confirmedCard | userCard | O | DCard | | | |
| RunDialog | dialogNtfCheck | D | boolean | 902 | | select transaction misused |
| ConfirmedTrigger | activeTransactions | O | DTransaction | | | |
| RunDialog | dialogInf1 | D | boolean | 902 | | Notify on precautions taken |
| setCompleteReason | closeTheReason | O | boolean | | | inform user of stolen card |
| RunDialog | dialogInfStolen | D | boolean | 902 | | transfer to fraud specialist |
| setPerformTransfer | performTransfer | O | boolean | | | |
| * | | | | | | |

Record: 1 of 7 | ▸ ▸▸ | No Filter | Search

| Type | parameterName | valueName | id | valueConstant | valueNameField | condition |
|---|---|---|---|---|---|---|
| * | | | | | | |

Fig. 4a

| Personetics Advisor Dashboard | | | |
|---|---|---|---|
| Dashboard \| Logs | | | |
| Active Cases | Case Information | | |
| ⊕ David Sosna<br>Jan11 2011 7:04:12PM | David Sosna  End Session  Jan 11, 2011 7:04:12 PM | | |
| ⊕ Lydia Rust<br>Jan11 2011 7:03:15PM | Long Term Indicators | | |
| | Any Success Attempt Time | 2010/09/21 10:33:00 | Edit |
| | Any Non Success Attempt Time Transaction | 805004 | Edit |
| ⊕ Kydia Rust<br>Jan11 2011 6:12:00PM | ATM Rejected Attempt Time | 2010/9/21 10:33:00 | Edit |
| | ATM Rejected Attempt Time Transaction | 605004 | Edit |
| ⊕ David Sosna<br>Jan11 2011 6:12:52PM | Unable to Access Online Banking Time | 2010/08/12 10:36:50 | Edit |
| | Unable to Access Online Banking Transaction | 618002 | Edit |
| | Last Non Personetics Usage | 2010/09/21 10:36:46 | Edit |
| | Number of Accounts | 1 | Edit |
| | Number of Cards | 1 | Edit |
| | User Input | | |
| | I have a $21 transaction that I do not recognize | Text | Edit |
| | Intent Analysis (Reasons) | | |
| | I have a charge on my statement that I do not recognize | 120 | Confirm |
| | I have an ATM withdrawal that I do not recognize | 49 | Confirm |
| | My card's PIN is not working | 66 | Confirm |
| | Trigger Analysis (Trigger) | | |
| | TransactionHints Starbucks 07030 20.0$ 2010/09/04 10:36:50 Card Blue*3461 | 913001 | Edit |
| | TransactionHints Panera Break Broadway 28.0$ 2010/09/18 10:36:50 Card Blue *3461 | 902002 | Edit |
| | TransactionHints Joe Pizza 0739017.67$ 2010/09//16 10:36:50 Card Blue *3461 | 802002 | Edit |
| | TransactionHints L.F. Hoboken 21.85$ 2010/03/04 10:36:50 Card: Blue *3461 | 723001 | Edit |
| | TransactionHints Joe Pizza 0739017.67$ 2010/09//16 10:36:50 Card: Blue *3461 | 802002 | Edit |
| | TransactionHints Consumer Customer reports<br>membership 24.0$ 2010/09/20 10:36:50 Card Blue*3461 | 712002 | Edit |
| | TransactionHints AMAZON.COM 20.0$ 2010/08/18 10:36:50 Card: Blue *3461 | 618002 | Edit |
| | Root Cause Analysis | | |
| | rootCauseHints   Household | 200 | Edit |
| | rootCauseHints   Alternative Name | 100 | Edit |
| | Chat Console | | |
| | | | |
| | Submit \| Escalate | | |

| Dialog Type | Class Name | # of values selected | Echoing message text |
|---|---|---|---|
| selectPredefinedOne | | 1/2/3/.../ 0=none of above | I select %text% |
| selectPredefinedOne | Request | | The issue is %requestname% |
| selectPredefinedMultiple | | 3 | I select %value1%, %value2%, and %value3%. |
| selectParameterOne | | | My answer is "%value%". |
| selectTF | | | %value%. |
| selectTFParameter | | | My answer is %value%. |
| selectParameterMultiple | | | |
| enterText | | | %text% |
| selectTransactionOne | | 1 | The TX from %TXdate% for %TXamount% at %TXdesc%. |
| selectTransactionMultiple | | 2 | The TX from %TXdate% for %TXamount% at %TXdesc%, and the TX from %TXdate% for %TXamount% at %TXdesc%. |
| enterSignature | | | Here is my signature / I am not willing to provide signature |
| enterPicture | | | Here is the picture you requested |

| account-type: | card | credit-card | my-account | | | | | | |
|---|---|---|---|---|---|---|---|---|---|
| where detected: | statement | | | bill (date) | card-card-bill | monthly-bill | monthly-statement | | |
| | | | | | last current (date) | previous recent | most-recent | | |
| topic: | never-see | too-much | too-high | not-recognize | | | not-understand | why-are-there | is-charged | got-charged |
| | | | | | | | | | charge-me | |

| | | | | | |
|---|---|---|---|---|---|
| account-type | | card | | credit-card | my-account |
| | | | | | |
| TX type: | fee | a-fee | | service-fee | service-charge charge |
| | sub-type | late-fee | | due-date | |
| | | | | balance | |
| | | | | (amount) | |
| | | | | sent | |
| | | | | (date) | |
| | | | | root-cause | late-payment === linked to payment |
| | | | first-time | never-been-one-before | never-received |
| | | | never-disclosed | | |
| | sub-type | ATM | | root-cause | ATM fee === linked to withdrawal |
| | | | first-time | never-been-one-before | never-received |
| | | | never-disclosed | | |
| | fee prop: | (amount) | | | |
| | | (date) | | | |
| | | | | | |
| ID's of the TX: | | | | | |
| | | | | | |
| action | waive | remove | taken-off | credit | eliminate-it |
| | explain | break-down | help-me-understand | | |
| | cancel-account | | | | |
| | speak-to-someone | | | | |

Fig. 7c

Customer service

1 What is an Overdraft Item fee?
1 What is an Extended Overdrawn Balance Charge (EOBC)?
1 What is an Overdraft Protection Transfer fee?
1 What is a Non-Sufficient Funds fee also known as NSF: Returned Item Fee?
1 What is an Out-of-Network or Foreign ATM fee?
1 What is a Check Enclosure fee?
1 What is a Stop Payment fee?
1 I noticed an $8 service fee charge at the end of the month that I had never seen before
1 I was charged too much for service fees
1 The service fees are too high - it's ridiculous
1 I would like to know why I got charged service fees
1 Can you please explain why I was charged with this service fee
1 I was charged a fee recently to use my card in an ATM machine. I thought my bank had a no fee benefit.

Fig. 7d

| | |
|---|---|
| credit card | Why did I receive additional interest charges after I paid my balance in full? |
| | Why is my available credit less than the difference of my credit line and balance? |
| | What is my due date? |
| | What is the monthly maintenance fee on your checking accounts? |
| | What do savings accounts cost? |
| | What is an interest charge and when does it occur? |
| | What is a Late Fee? |
| | What is a Cash Advance Fee? |
| | What happens when my credit card is charged with a Returned Payment Fee? |
| | What late fees are charged to my accounts? |
| | They charged me $30 for a late fee on a $50 balance sent to them 5 days prior to the due date |
| | I'd appreciate your waiving the service fee this time and it won't happen again |
| | Can I set-up online alerts or notifications related to my credit card account? |
| credit card | I don't understand why I am being charged a late payment fee when I had my bank send a payment on time - and they claim they did. |
| credit card | I would like to cancel my card. I received a letter that indicated that the bank is now charging an annual fee for the card and I'm not interested in being charged for using a credit card. There are lots of banks that offer cards with no annual fees. |

COMPUTERIZED DATA-AWARE AGENT SYSTEMS FOR RETRIEVING DATA TO SERVE A DIALOG BETWEEN HUMAN USER AND COMPUTERIZED SYSTEM

REFERENCE TO CO-PENDING APPLICATIONS

Priority is claimed from U.S. Provisional Patent Application No. 61/536,142, entitled "Method and system for automated-context-aware-dialogue with human users" and filed Sep. 19, 2011.

FIELD OF THIS DISCLOSURE

The present invention relates generally to computerized systems and more particularly to computerized systems conducting dialog with a human user.

BACKGROUND FOR THIS DISCLOSURE

Expert systems and algorithms such as rule-based forward chaining which serve them are known.

DFS (depth first search) computerized algorithms for searching, e.g. data stored as a topological tree in computer memory, are known.

Dijkstra's algorithm is one of various known graph search algorithm variations that solve the single-source shortest path problem for a graph with nonnegative edge path costs, producing a shortest path tree.

Using known spectral graph analysis techniques, topological properties (e.g., patterns of connectivity) of graphs can be analyzed in terms of spectral graph theory which, according to Wikipedia, "is the study of properties of a graph in relationship to the characteristic polynomial, eigenvalues, and eigenvectors of matrices associated to the graph, such as its adjacency matrix or Laplacian matrix. For example, an undirected graph has a symmetric adjacency matrix and therefore has real eigenvalues (the multiset of which is called the graph's spectrum) and a complete set of orthonormal eigenvectors. While the adjacency matrix depends on the vertex labeling, its spectrum is graph invariant. Spectral graph theory is also concerned with graph parameters that are defined via multiplicities of eigenvalues of matrices associated to the graph, such as the Colin de Verdière number."

US Patent Application 20120016678, assigned to Apple, is entitled Intelligent Automated Assistant, published Jan. 19, 2012, and filed Jan. 10, 2011. This published application describes an intelligent automated assistant system which "engages with the user in an integrated, conversational manner using natural language dialog, and invokes external services when appropriate to obtain information or perform various actions. The system may be implemented using any of a number of different platforms, such as the web, email, smartphone, and the like, or any combination thereof. In one embodiment, the system is based on sets of interrelated domains and tasks, and employs additional functionally powered by external services with which the system can interact."

The disclosures of all publications and patent documents mentioned in the specification and of the publications and patent documents cited therein directly or indirectly are hereby incorporated by reference. Materiality of such publications and patent documents to patentability is not conceded.

SUMMARY OF CERTAIN EMBODIMENTS

According to one embodiment, data-aware agents are provided having a data retrieval approach which connects a virtual robot/agent to enterprise systems.

Virtual robots employ external data from the enterprise systems to answer questions and to generate a dialog with the customer. Virtual agents need to be preloaded with vast amounts of data to be able to perform. A proposed system imitates human agent activity by accessing the systems only when needed using a knowledge representation of data and reasoning process which compute the necessity and cost for retrieving a certain data element. A mechanism is able to playback human-generated queries which are executed in real-time to capture additional information necessary to the continuation of the process.

The present invention typically includes at least the following embodiments:

Embodiment 1: A method for providing data-aware agents having a data retrieval approach which connects a virtual robot/agent to enterprise systems being served.

Embodiment 2: A method according to embodiment 1 which imitates human agent activity by accessing the systems only when needed using a knowledge representation of data and reasoning process.

Embodiment 3: A method according to embodiment 2 wherein said system computes the necessity and/or cost for retrieving certain data elements.

Embodiment 4: A method according to any of embodiments 2 or 3 wherein the method is able to playback human-generated queries which are executed in real-time to capture additional information necessary to the continuation of the process.

Embodiment 5: A method according to any of the preceding embodiments wherein an automated chat system is provided which is operative to understand the user intent and to decide what should be the best response (dialog) to the user.

Embodiment 6: A method according to any of the preceding embodiments which requires the designer of the system to define less than all of the paths in the process (example: a→b→c, a→c→b).

Embodiment 7: A method according to embodiment 6 which requires the designer of the system to define none of the paths in the process.

Embodiment 8: A method according to any of the preceding embodiments which requires the designer of the system to define less than all of all options in all steps.

Embodiment 9: A method according to embodiment 8 which does not require the designer of the system to define any of said options.

Embodiment 10: A method according to any of the preceding embodiments which prioritizes for the user the most probable options on the top and other related options which were used by other users.

Embodiment 11: A method according to any of the preceding embodiments which suggests alternatives steps based on "similar" and not only exact situations.

Embodiment 12: A method according to any of the preceding embodiments including defining related dialogs to be injected into the conversation based on context.

Embodiment 13: A method according to embodiment 12 wherein said defining relates to a conversation related to a lost card or an issue of a card and the method then allows the user to look at delivery options.

Embodiment 14: A method according to any of the preceding embodiments which uses at least one recent transactional event to predict the topic of the conversation.

Embodiment 15: A method according to embodiment 14 in which said prediction occurs sometimes without even asking the user.

Embodiment 16: A method according to any of the preceding embodiments which takes into consideration what the user did in the past.

Embodiment 17: A method according to any of the preceding embodiments which takes into consideration recent events which happened to the user and may have impacted his request.

Embodiment 18: A method according to any of the preceding embodiments which allows the user to take the conversation in different directions.

Embodiment 19: A method according to embodiment 18 which starts with a process to replace a card, asks about the balance of this card, and continues the replacement process.

Embodiment 20: A method according to any of the preceding embodiments which recommends to the user what should be the next logical step based on experience from other users.

Embodiment 21: A method according to any of the preceding embodiments which handles at least one undefined situation without escalation to a human agent.

Embodiment 22: A method according to any of the preceding embodiments which uses user historical behavior to decide which dialog to present to the user.

Embodiment 23: A method according to any of the preceding embodiments 14 or 15 wherein said recent transactional event comprises a recent declined transaction.

Embodiment 24: A method according to any of the preceding embodiments which can start from any point with different type of inputs and decide based on current information what will be the next step.

In accordance with an aspect of the presently disclosed subject matter, there is provided a dialog-generating method operative to generate dialog between a computerized system and a human user, the method comprising: generating a topological representation of possible paths leading to at least one goal, wherein each path includes a sequence of nodes and each node is defined as including or not including data retrieval from an external source; and using the topological representation to optimize dialog including selecting paths which reduce interaction with at least one computerized enterprise serving as an external source of data.

In accordance with an embodiment of the presently disclosed subject matter, there is provided a method wherein each path comprises a possible dialog.

In accordance with an embodiment of the presently disclosed subject matter, there is further provided a method wherein at least one node is defined as including or not including data retrieval from an external source comprising a human user to whom the system may direct a question.

In accordance with an embodiment of the presently disclosed subject matter, there is yet further provided a method wherein at least one node is defined as including or not including data retrieval from an external source comprising the computerized enterprise.

In accordance with an embodiment of the presently disclosed subject matter, there is yet further provided a method wherein a utility value is assigned to each goal.

In accordance with an embodiment of the presently disclosed subject matter, there is yet further provided a method wherein a query block operating within a reasoning framework, having initiated a query comprising a request for data from an external data system, returns control to the reasoning framework without waiting for the data to become available.

In accordance with an embodiment of the presently disclosed subject matter, there is yet further provided a method wherein queries' execution durations are statistically analyzed to gradually learn average execution duration.

In accordance with an aspect of the presently disclosed subject matter, there is provided a data gathering system, the system comprising: a data-aware knowledge base storing knowledge on relative costs of obtaining various data items; and a data retrieval decision-making processor operative, when an individual data element is sought to be retrieved, to determine whether or not to retrieve the data element by comparing at least one parameter representing need for the data element with at least one parameter, retrieved from the data-aware knowledge base, which represents relative cost of obtaining the data element.

In accordance with an embodiment of the presently disclosed subject matter, there is provided a system wherein the knowledge base includes a hierarchy of costs wherein data which can be obtained without engaging either the user or an enterprise system serving the user is assigned a relatively low cost, data which is obtained by engaging the enterprise system is assigned a medium cost which exceeds the relatively low cost, and data which is obtained by engaging the user is assigned a high cost which exceeds the medium cost.

In accordance with an embodiment of the presently disclosed subject matter, there is further provided a system which imitates human agent activity by accessing the systems only when needed using a knowledge representation of data and reasoning process.

In accordance with an embodiment of the presently disclosed subject matter, there is yet further provided a system wherein the system computes the necessity and/or cost for retrieving at least one data element.

In accordance with an embodiment of the presently disclosed subject matter, there is yet further provided a system wherein the system computes the cost for retrieving at least one data element.

In accordance with an aspect of the presently disclosed subject matter, there is provided a data gathering method comprising: storing knowledge on relative costs of obtaining various data items, thereby to generate a data-aware knowledge base; and when an individual data element is sought to be retrieved, determining whether or not to retrieve the data element by comparing at least one parameter representing need for the data element with at least one parameter, retrieved from the data-aware knowledge base, which represents relative cost of obtaining the data element.

In accordance with an embodiment of the presently disclosed subject matter, there is provided a method also comprising: playing back human-generated queries previously executed in real-time and recorded, capturing additional information from the queries, and using the additional information to facilitate the determining.

In accordance with an embodiment of the presently disclosed subject matter, there is further provided a method wherein, when a query block is executed, defining a query, a starting time of the query is stored and a duration to gain access to results requested by the query is estimated as average execution duration for the query minus elapsed processing time since the starting time.

In accordance with an embodiment of the presently disclosed subject matter, there is yet further provided a method wherein the using: accesses a data-aware knowledge base storing knowledge on relative costs of obtaining various data items; and employs a data retrieval decision-making processor operative, when an individual data element is sought to be retrieved, to determine whether or not to retrieve the data element by comparing at least one parameter representing need for the data element with at least one parameter, retrieved from the data-aware knowledge base, which represents relative cost of obtaining the data element.

In accordance with an embodiment of the presently disclosed subject matter, there is yet further provided a system wherein the parameter representing need for the data element comprises a utility value.

In accordance with an aspect of the presently disclosed subject matter, there is provided a computer program product, comprising a non-transitory tangible computer-readable medium having computer-readable program code embodied therein, the computer-readable program code adapted to be executed to implement any of the methods shown and described herein.

In accordance with an aspect of the presently disclosed subject matter, there is provided a computer program product, comprising a non-transitory tangible computer-readable medium having computer-readable program code embodied therein, the computer-readable program code adapted to be executed to implement a method for assigning relative scores to various possible intents on the part of a user approaching a virtual agent, the method comprising: predicting priority topics, including gathering first data and employing the first data to discern and seek user confirmation of at least one possible intent on the part of the user; and subsequent to receipt of the confirmation, gathering second data and employing the second data to provide service to the user to suit the user's confirmed intent.

Also provided, excluding signals, is a computer program comprising computer program code means for performing any of the methods shown and described herein when said program is run on a computer; and a computer program product, comprising a typically non-transitory computer-usable or -readable medium, e.g. non-transitory computer-usable or -readable storage medium, typically tangible, having a computer-readable program code embodied therein, said computer-readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a typically non-transitory computer-readable storage medium.

Any suitable processor, display and input means may be used to process, display, e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein, such as but not limited to steps of flowcharts, may be performed by a conventional personal computer processor, workstation or other programmable device or computer or electronic computing device or processor, either general-purpose or specifically constructed, used for processing; a computer display screen and/or printer and/or speaker for displaying; machine-readable memory such as optical disks, CD-ROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine-readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, terms such as "processing", "computing", "estimating", "selecting", "ranking", "grading", "calculating", "determining", "generating", "reassessing", "classifying", "producing", "stereo-matching", "registering", "detecting", "associating", "superimposing", "obtaining" or the like refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor may be employed to compute or generate information as described herein e.g. by providing one or more modules in the processor to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings:

FIGS. 4a-4g illustrate an example implementation of a computerized system including a data-aware agent subsystem, operative in conjunction with an Intent Scoring subsystem and Smart Reasoning subsystem.

FIGS. 7a-7d illustrate example fee knowledge sentences which may be used e.g. for customer service or credit card-type dialogs.

Computational components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer-readable medium and executable by at least one processor, or any suitable combination thereof. A specific functional component may be formed by one particular sequence of software code, or by a plurality of such, which collectively act or behave as described herein with reference to the functional component in question. For example, the component may be distributed over several code sequences such as but not limited to objects, procedures, functions, routines and programs and may originate from several computer files which typically operate synergistically.

Data can be stored on one or more tangible or intangible computer-readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

Conventional dialog systems are a form of expert system technology which add new demands regarding optimization of user experience to existing problem solving demands of standard expert systems.

Figure 1:
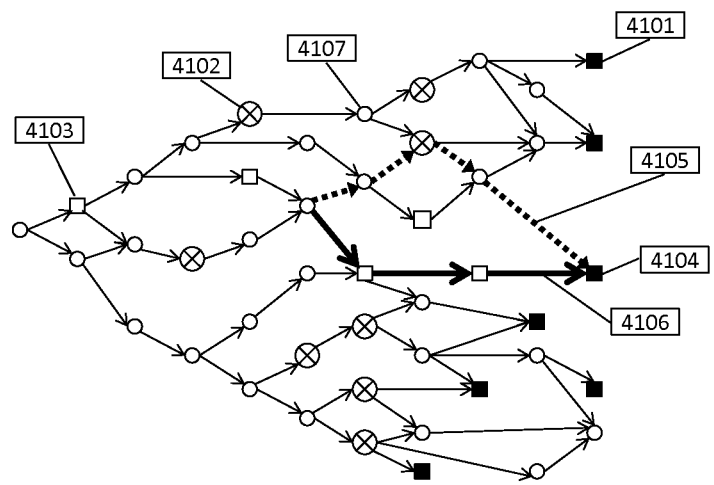
FIGS. 1-2 are diagrams representing aspects of computerized data-aware agent systems for retrieving data to serve a dialog, according to certain embodiments of the present invention.

FIG. 1 is a diagram of potential execution paths of a backward-chaining based expert system. The system works backwards, from a set of desired goals denoted as black squares, 4101, back to dependent data items required to attain the goals. Some of the vertices (items) in the diagram include data retrieval from external information systems (crossed circles, 4102). Some are "user dialog items" which include posing direct questions to the user (rectangles, 4103). Still others do not include any retrieval e.g. include data processing only (empty circles in FIG. 1).

Typically, the dialog system shown and described herein goes beyond problem solving and seeks in addition to enhance the overall conversational experience of the user. For example, FIG. 1 is a diagram which illustrates two potential execution paths 4105, 4106 represented by dotted and solid lines respectively that lead to a single desired goal (4104). One such path (4106) includes two intermediate user dialog items, while the other (4105) calls for the retrieval of data from external systems. Typically, the system of the present invention takes into account the impact that direct user questions and information gathering delays have on a human user's experience, and thus selects an execution path that optimizes or improves this experiential aspect of the dialog being conducted between human user and computerized system.

Many existing expert system algorithms (e.g. rule-based forward chaining) involve up-front loading of large volumes of data into working memory. This limits the effectiveness of such algorithms for problems such as financial customer service, which is characterized by reasoning over extensive personal transaction archives.

One method to reduce up-front data retrieval is to embed on-demand data collection into a reasoning process. However, when dealing with large data sets and slow information systems, on-demand retrieval may have a negative effect on user experience as the user has to wait for new data to arrive. Unfortunately, asynchronous on-demand data collection heuristics that may help reduce this latency may be costly to develop, debug and maintain in current systems.

Figure 2:
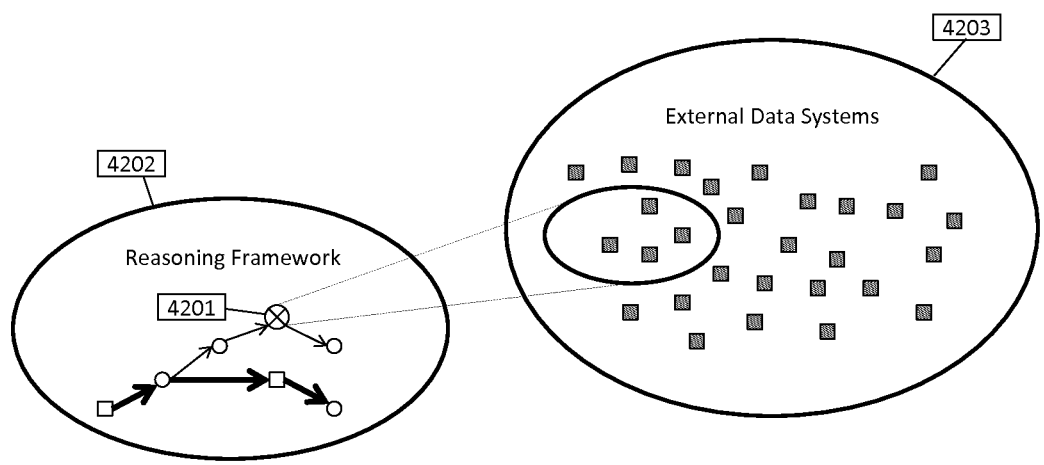

Some or all of the following technical features may be provided:

Query Blocks—query execution blocks which handle communication with external systems e.g. as described herein with reference to FIG. 2. Query blocks are typically asynchronous; they monitor their own progress and estimate remaining execution duration at each point in time.

Utility Values—used to model expected gains to user experience e.g. as described herein. Utility values are assigned to goal items according to the business desirability of the goal. Utility values are also assigned to parameter item references—e.g. references that define a link between a reasoning item and items that the reasoning item depends on for input. Item reference utility values indicate the expected benefit to user experience if an individual referenced item becomes available.

Cost Values—values used to represent expected detriment that executing an item, e.g. as represented by a node in the graph of FIG. 1, may have on user experience. Cost values may change over time especially for long-running query items.

Figure 3:
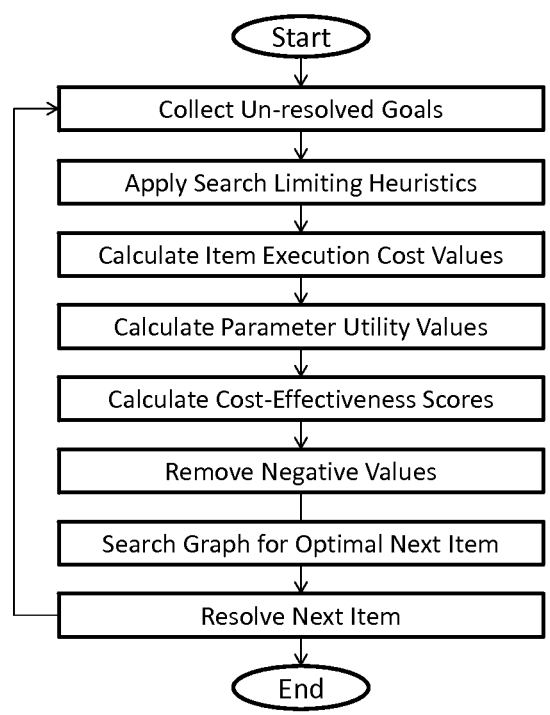
FIG. 3 is a simplified flowchart illustration of a method of operation for a data-aware agent system constructed and operative according to certain embodiments of the present invention.

Experience Optimizing Reasoning—an enhanced reasoning process which uses optimization to find a most cost-effective item to resolve at each processing iteration e.g. as per FIG. 3. The process uses utility and cost values, e.g. as above, to assess the cost-effectiveness of parameter links and to find the most cost-effective next item to resolve. In one embodiment, spectral graph analysis optimization is used to identify a most cost-effective item.

Figure 8:
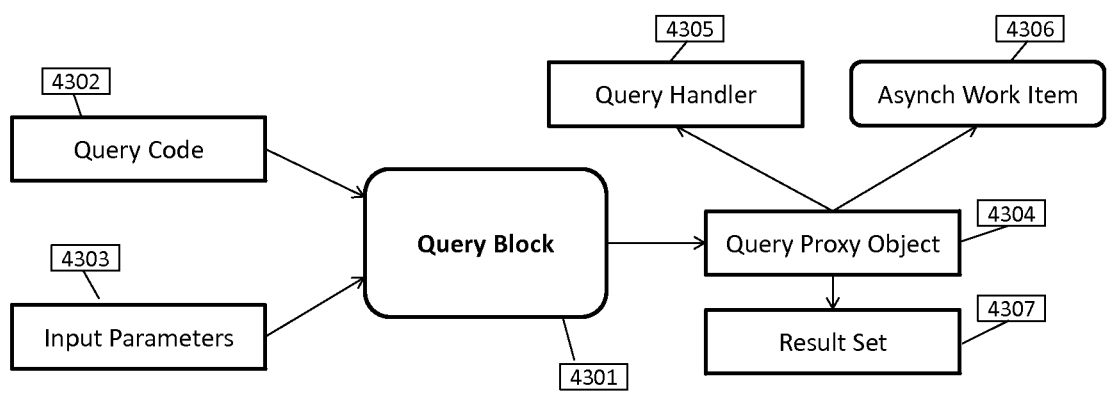
FIG. 8 illustrates a simplified view of Query Block functionality provided according to certain embodiments of the present invention.

On demand query execution and timing: on-demand integration with external data systems is brought to the reasoning framework using Query Blocks. A Query Block comprises executable computer code running in the context of the reasoning framework to communicate with external data systems e.g. as illustrated in FIG. 8 which illustrates Query Block Functionality according to certain embodiments of the present invention.

Inputs for the Query Block (4101) include a query code (4302) and a list of name-value pairs as query parameters (4303). The parameter list may be empty.

The output of the Query Block (4301) typically comprises a Query Proxy (4304) that typically includes some or all of the following components:

Query Handler (4305)—a unit of computer code with relevant configured data that effects actual communication with the external data systems. In one embodiment a database query handler together with SQL configuration data is used to query a relational database. In another embodiment, a SOAP web services handler together with a WSDL service description is used to execute an action on an external system by invoking a SOAP web service. Other embodiments may include handlers for Enterprise Service Bus (ESB) based integration, message queue base integration, direct file access, terminal emulation integration, screen scraping and more.

Asynch Work Item (4306)—an instance of an asynchronous work item for the execution of computer code in a separate execution thread. One embodiment may use as implementation of the Java EE javax.resource.spi.work interface (as described in Java EE 5 SDK at the following http link: docs.oracle.com/javaee/5/api/javax/resource/spi/worldWork.html,
to execute Java code in the context of a Java Work Manager.

Result Set (4307)—a data structure holding query execution results. At the beginning of a query the Result Set may be empty or non-existent. The Result Set may be partially full during query execution and typically must be complete upon query return. In one embodiment a SQL tabular data structure may be used as a Result Set for a database query. In another embodiment an XML tree structure may be used as a Result Set for a web service call. In a third embodiment, a Java Set<Object> collection may be used as Result Set holding references to Java Objects. Other embodiments may for example include textual results, lists and/or custom objects.

Figure 9:
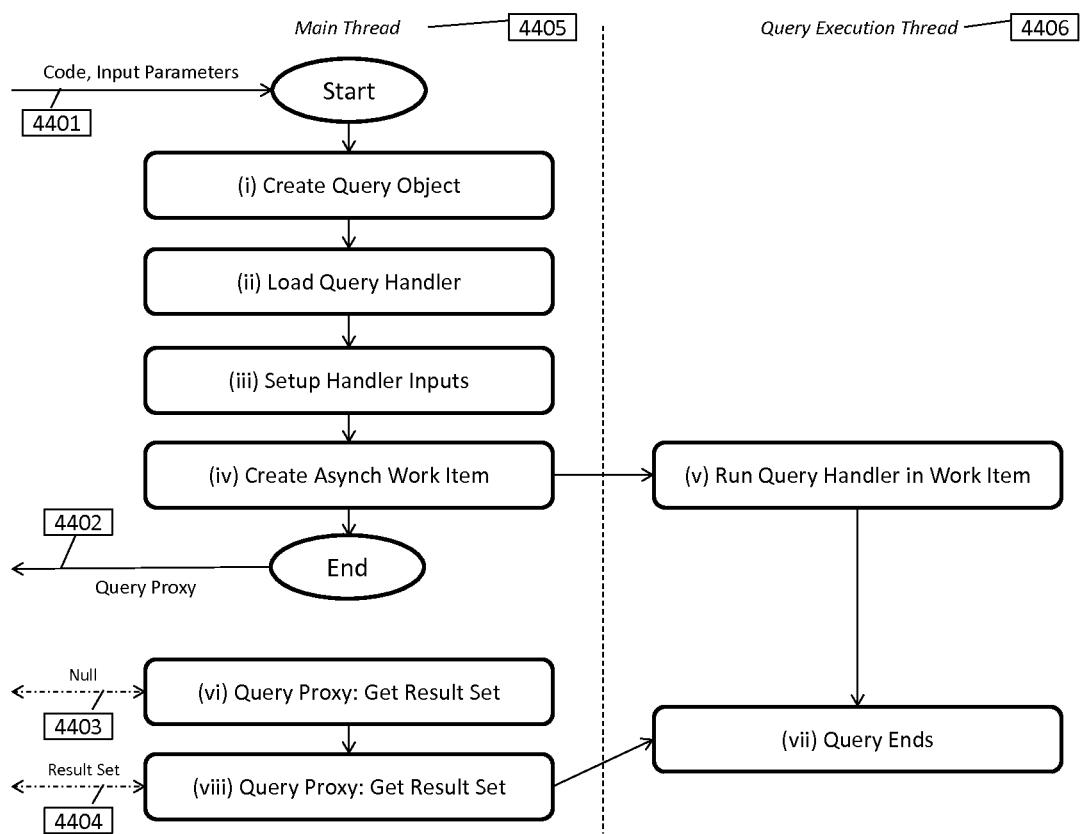
FIG. 9 presents an example of the flow of Query Block and Query Proxy execution.

The flow of the Query Block (4101) according to an embodiment of the present invention is shown in FIG. 9. The flow typically begins in a main execution thread (4405) as the reasoning framework resolves a Query Item by executing a Query Block (4401).

In Step (i), the block creates and empty Query Proxy (4304).

In Step (ii), the blocks uses a Query Handler Repository to find and load a Query Handler (4305) according to the Query Code (4302) that the block received as input. In one embodiment the Query Handler Repository may be implemented using a Java Map<QueryCode,QueryHandler> object that maps QueryCodes to pre-registered instances of the QueryHandler interface.

In Step (iii), the block initializes the Query Handler instance with the input parameters it received from the reasoning framework.

In Step (iv), the block creates a new Asynch Work Item (4306) and uses the Asynch Work Item to start the execution of the Query Handler in a new dedicated Query Execution Thread (4406). The block typically does not wait for the Query to complete; instead the block sets the value of its Query Item to the newly created Query Proxy (4402) and ends its execution. Thus, control returns to the reasoning framework.

At this point in time, reasoning continues in the Main Thread (4405) as the Query Handler runs concurrently in step (v) in the Query Execution Thread (4406).

As reasoning continues, subsequent reasoning items may access the value of the Query Item using item references and thus gain access to the Query Proxy. These items may use the Query Proxy object to access its Result Set using the GetResultSet call.

Step (vi) illustrates a case where GetResultSet is called (4403) before the query ends (vii). In this case, according to some embodiments, the call may return null or may return a partial Result Set or block the main thread, wait for the query to end and return a complete Result Set.

Step (viii) illustrates a case where GetResultSet is called (4404) after the query ends (vii). In this case, Query Proxy typically collects the Result Set using its Asynch Work Item and makes it available to the referencing reasoning item.

Query Blocks are asynchronous by nature. Executing a query block takes near zero time allowing the system to trigger data retrieval requests without blocking the data retrieval requests' operations or degrading user experience. Once triggered, the reasoning process of FIG. 3 accounts for query progress to optimize the timing of query result usage and keep blocking to a minimum. This optimization is achieved without employing active consideration by human or other knowledge implementers.

Query Blocks may be employed in the context of hosting dialog systems. FIG. 2 illustrates typical usage of Query Blocks. When executed, Query blocks typically allow a reasoning framework to peek into larger pools of domain data that may exist in external information systems (4203).

The terms "Domain Data" and "External Data Systems" are used herein generally synonymously.

The system typically employs computerized statistical analysis of query execution to gradually learn queries' average execution duration and to store this information for internal use. When a query block is executed, the starting time of its query is recorded. Using information about its average execution duration and the start time of the query, the block may estimate the duration of time which will elapse in order to gain access to results at each point in time. Typically, before the block is fired, estimated duration is equal to the average execution duration; during query progress, estimated execution duration is equal to average execution duration minus elapsed processing time, and finally, after the query completes estimated execution, the duration equals zero.

Utility values may be employed to model expected gains to user experience. Utility values are assigned to goal items to indicate benefit for the user, e.g. in relative terms, of attaining each goal. Utility values reflect external consideration such as the business desirability of the goal. For example, helping the user contact a human service operator is a less desirable goal than solving his problem using automated dialog.

Utility values are also assigned to references between a reasoning item and the items that the reasoning item, in turn, refers to as data input sources. A reasoning item is an atomic data processing unit for the reasoning algorithm and is illustrated as a circle or square node in FIG. 1. When resolved the reasoning item may present an interactive dialog to the user (4103), perform computations (4107), query information from external systems or execute actions on external data systems (4102). Item reference utility values indicate the benefit to the user experience that might be accrued if the parameter becomes available. Benefits may include, for example, better decision making, better prediction or improved data display. Parameter utility values typically extend the conventional concept of mandatory as opposed to optional parameters and create a continuum that extends from absolutely required parameters (utility=1), via partially-required parameters (0<utility<1) to totally optional parameters (utility=0).

Parameter utility values may vary over time depending on current availability of other parameters. For example, consider an item that accepts two alternative inputs $I_1$ and $I_2$. When both $I_1$ and $I_2$ are unavailable, the utility assigned to each of them may be 1, because the item cannot be resolved without (one of) them. However when $I_1$ becomes available, the utility of $I_2$ becomes 0, since $I_1$ already provides all information needed to resolve the item.

Cost values may be used to model expected detriment to user experience that may arise from the execution of a reasoning item or from reliance on its outputs.

Typically, simple computational items e.g. as represented by empty circles in FIG. 1, receive a zero cost value since they hardly affect user experience. On the other hand, reliance on results from long running query items often receive higher cost values since noticeable hence irksome latency is typically required to retrieve data from external systems. Finally, the execution of interactive dialog items that require the user's active attention and have a high impact on his experience receive even higher cost values.

Item cost values may change over time. For example, the expected cost of relying on results of a long-running data query may diminish, as the time since the start of the query approaches the query's expected execution duration.

FIG. 3 is a simplified flowchart illustration of a dialog optimization method operative in accordance with certain embodiments to produce dialog which solves user issues while optimizing user experience. The method includes some or all of operations i-viii, suitably ordered e.g. as shown, and illustrates reasoning flow operative to solve user issues while optimizing user experience. The method of FIG. 3 typically comprises a main loop for each step of dialog in which each process iteration examines the set of un-resolved goals and attempts to take the optimal next execution step to attain these goals.

Typically, operation i of FIG. 3 collects a set of relevant goals to serve as a basis for search. Heuristics e.g. as described herein may be applied to focus or broaden the reasoning scope. In one embodiment, only un-resolved goals from a current topic are collected (focusing). According to another embodiment, goals from ancestor topics are also examined (broadening). In such cases, the distance of the ancestor from the current topic may be used to decrease the utility assigned to the ancestor's goals.

In operation ii, the algorithm applies search-limiting heuristics to identify relevant items for investigation. According to one embodiment, no limits are applied, allowing search to include all un-resolved items. According to one embodiment, a depth-limited version of a conventional DFS algorithm or other suitable technology may be employed to limit searching to only those unresolved-items reachable by no more than N item reference steps (illustrated as edges in FIG. 1) from any of the goal items.

Operation iii computes the current cost of all identified items based on their execution timing and statistics e.g. as described above.

In operation iv, the utility of all un-resolved item parameters is determined according to current data availability e.g. as described above.

Operation v computes cost-effectiveness scores for each parameter link One embodiment computes cost-effectiveness scores by subtracting cost from utility. However, more advanced computations using value normalization and higher order cost penalties may also apply. Some embodiments reduce cost-effectiveness scores as an increasing function of, e.g. in proportion to, their distance from a goal item, to reflect the backward-chaining nature of the reasoning process of FIG. 3. In some embodiments, negative scores are avoided e.g. eliminated (step vi) in order to enable the use of Dijkstra-based search algorithms and spectral graph analysis techniques.

In operation vii, actual optimization is effected, typically including trying to find the most cost-effective next item to resolve in a directed graph with weighted edges. In one embodiment, a Laplacian matrix representation of the directed graph is generated and the graph's spectral decomposition is examined. In this embodiment, the most cost-effective item will correspond to the smallest non-zero matrix eigenvalue. Other embodiments may use heuristics, such as locating the most cost-effective edge with distance no larger than N from a goal item, as an approximation of optimal next item selection.

In operation viii, the selected most cost-effective item is executed. The method of FIG. 3 then loops back to step i thereby to start a new iteration. Computation stops when a "user dialog" reasoning item is encountered, directing the system to suspend reasoning and wait for user input.

An advantage in terms of reduced cost of data integration is achieved by certain embodiments of the invention, due to ease of adaptation to existing data services in various deployment environments. The use of asynchronous query items as first class members of the reasoning process, coupled with the automated optimization of query timing and performance, allows implementers to quickly connect to existing client information services and focus their efforts on business aspects of the implementation.

Figure 5:
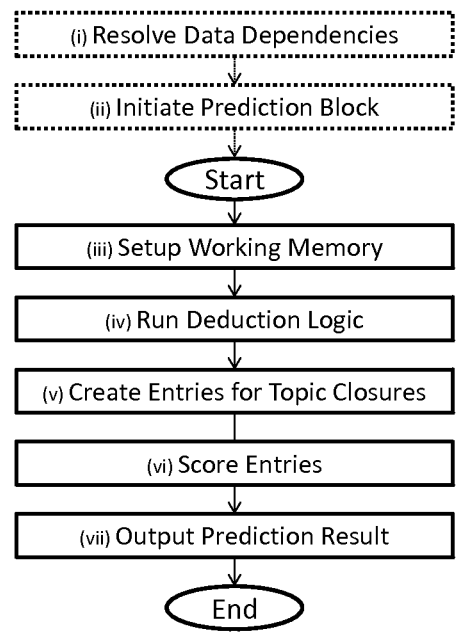
FIG. 5 is a simplified flowchart illustration of a method of operation for an intent prediction system operative in conjunction with a data-aware agent system, all according to certain embodiments of the present invention.

According to one embodiment, the system deploys a prediction model typically having intent scoring functionality operating e.g. as illustrated in FIG. 5, which uses key indicators e.g. derived from historical customer transactional activity for example credit card transaction or billing information. The model generates a list of topics or events which the customer is likely to raise. The system generates priority topics for prompting the customer before he inputs his request and a combined score which includes the input of the customer for improving the accuracy of a text retrieval system.

Figure 6:
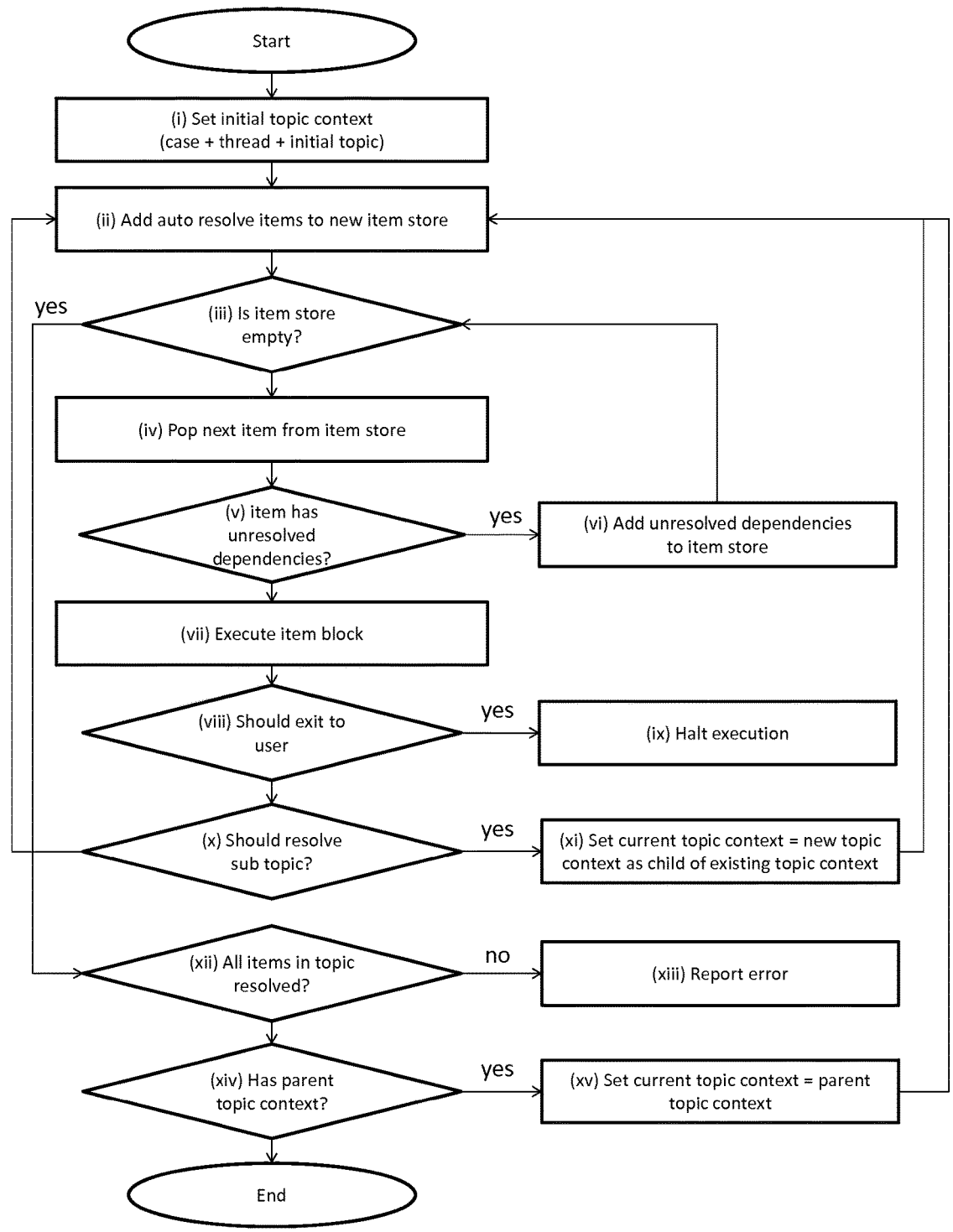
FIG. 6 is a simplified flowchart illustration of a method of operation for a smart reasoning system operative in conjunction with a data-aware agent system, all according to certain embodiments of the present invention; the method of FIG. 6 is suitable for example as a work flow for the reasoning framework of FIG. 2.

According to one embodiment, a Smart Reasoning system is provided, operating e.g. as illustrated in FIG. 6, which typically uses a domain-specific artificial intelligence computerized process which improves the limitation of current goal-driven expert systems.

Certain traditional goal-driven systems use many rules; cannot easily adapt to new situations; do not learn by experience and are not good at representing spatial knowledge. The system shown and described herein typically implements a conceptual learning capability which organizes knowledge in a generalized and abstract form, while at the same time making the system more useful and robust when coping with environmental changes. For example, actions acquired for one subject may be available for similar, but non-identical subjects. The system typically prioritizes asserted and/or inferred relations and/or deploys reinforced learning when selections sets are empty.

The intent scoring subsystem of FIG. 5, data-aware agents of FIGS. 1-3 and Smart Reasoning subsystem of FIG. 6 typically have a synergistic relationship therebetween.

An example implementation of a computerized system including a data-aware agent subsystem, operative in conjunction with an intent scoring subsystem and Smart Reasoning subsystem, is now described with reference to FIGS. 4a-4g; some or all of the technologies, functionalities, operations and systems shown herein may be provided. The computerized system may operate an off-line process supported by tools which capture user input and incorporate the captured input into the system, e.g. some or all of the following:

To manage and edit the ontology knowledge, an existing ontology editor may be used which may be customized to support specific requirements. Add-ins may be incorporated which express process knowledge including priorities, data requirements and other elements, some or all of which may be included in a customer service ontology.

FIG. 4a is an example screen display which expresses data variable requirements for lost & misused bank-card issues (topics).

Knowledge import: Banks maintain and publish detailed documents regarding the fees and the products that they are offering. The system may employ an easy import process which allows collecting data from documents and sheets which are controlled by the bank into an ontology structure. This process may conserve much implementation time and may use and/or reuse general available knowledge sources which are already maintained and updated by the banks e g Excel-based documents.

Figure 4B:
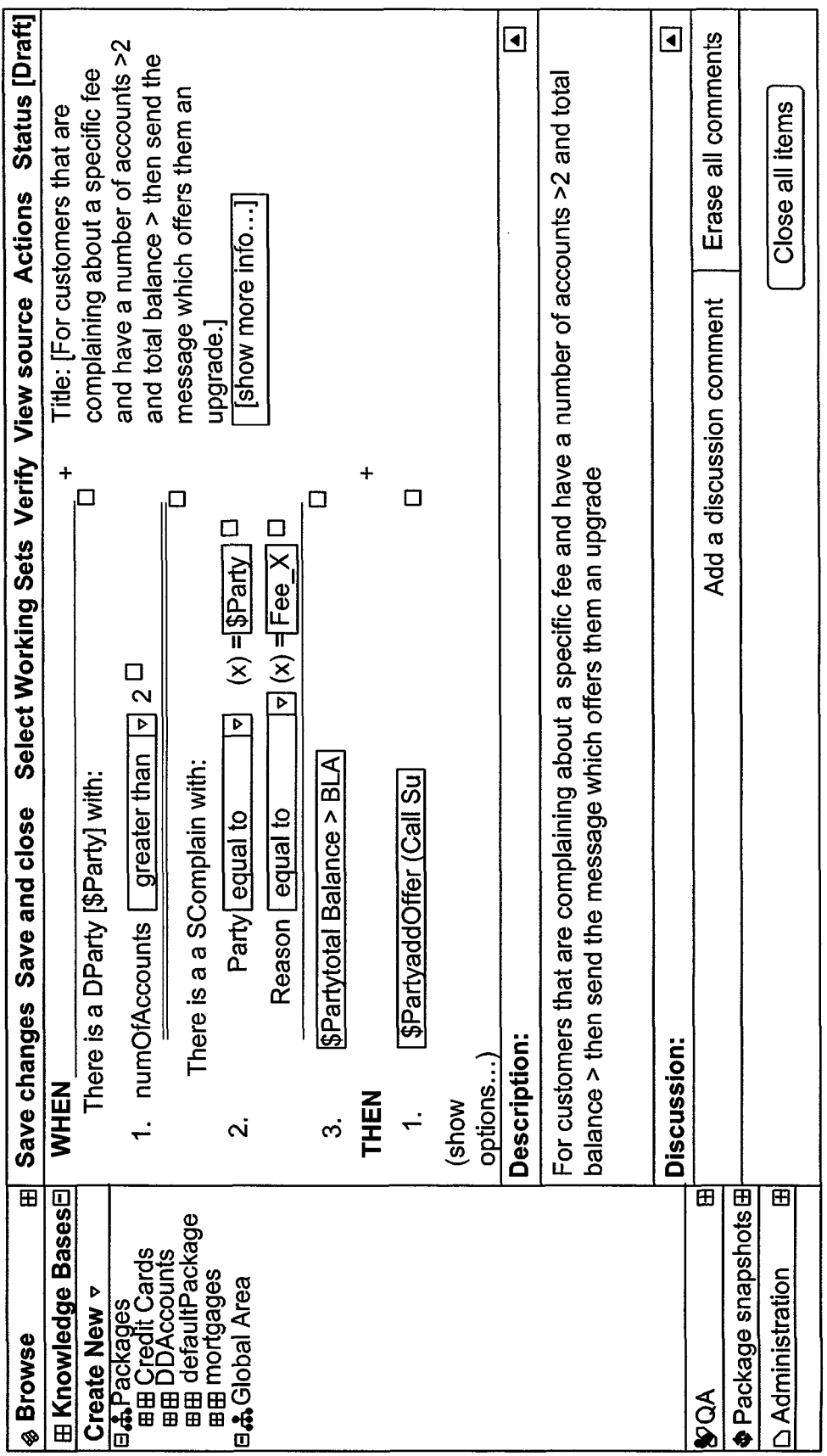

Most financial institutions implement a very similar service process to support their customers. Still there are differences which may need to be implemented by the bank. To support this, a user interface may be provided to allow a bank to add its own logic and rules into the system. The logic may be a simple rule for escalation or a complete new step based on a unique business requirement, e.g. as shown in FIG. 4b, which is an example in which the bank wants to offer an account upgrade for wealthy customers.

Human Advisor: It is desired to be able to transfer the process to a human agent. Such a requirement may be derived from a failure of the system to retrieve any next step or from a business policy which "escalates" a discussion or dialog for example for cases related to a large amount or which require an expert agent review. The transfer process may collect all relevant information e.g. some or all of the history of the dialog, collected variables and knowledge to a view. The agent may use the view screen and may be able to alter the progress of the process or to take over completely, e.g. as shown in FIG. 4c, which is an example of an advisor screen which supports both view and manual intervention by the agent.

A data access layer may provide an interface between a server serving a system according to an embodiment of the present invention and external data sources such as but not limited to existing banking core systems, banking web services and databases. The module may use conventional "screen scraping" techniques to access banking information through a graphical user interface used by human service agents. This capability may give the system access to the virtual agent desktop which exists today in most banks and contains relevant information which may be required for the agent and the system of the present invention to execute decisions.

To support the "screen scraping" which may comprise data mapping, a GUI interface may be provided which facilitates mapping a set of screens used by call center agents and graphically describes an automation task to retrieve data.

A second embodiment of a mobile banking system is now described with reference to FIGS. 4d-4f. Intent scoring, according to this embodiment, is operative for achieving accurate level of understanding in the specific context of customer requests, overcoming limitations of Natural Language Understanding using predictive analytics.

Conventional predictive analytics in "data rich" environments, such as banks, has reached a level where it is possible to accurately predict the probability of each customer activity. Such probability scores are already used in critical business decisions such as credit scoring (customer will/will-not pay their balance) and fraud scoring (the customer is/is-not the person making the request). It is possible to enhance the accuracy of the understanding, in "data rich" environments, by factoring in key indicators, described herein, which are derived from profiling data. The key indicators are derived from transactional data, house-holding data, click stream, peer groups, bank-wide events, and more.

Smart Reasoner, according to certain embodiments, operates a hybrid reasoning algorithm which adds continuance learning capability to the classic goal-driven approach. Conventional goal-driven systems often cannot easily adapt to new/unusual situations; do not learn by experience; and are not good at representing spatial knowledge. Typically, the Smart Reasoner has conceptual learning capability operative to review knowledge in a generalized and abstract form e.g. actions acquired for one subject are available for similar, but non-identical subjects, while at the same time making the system more useful and robust when coping with environmental changes. Typically, the Smart Reasoner utilizes relevant context information represented in ontology to appropriately tailor its responses to each specific situation. Smart Reasoner may take into account recent actions and events, current goals and priorities.

Two processes for collecting hints may be employed:
1. NLP process, which is operative to collect hints from the user input.
2. Profile Analytics, which is operative to collect key indicators based on the user transactions.

An intent scoring module is typically operative to accurately classify the customer request with the different classifiers (subject, action type, source, relations) together representing the user intention. An ontology is typically operative to collect and represent knowledge about the domain (ex: products and rates, problem solving (issues and potential resolutions), and track the progress of the conversation.

The Smart Reasoner may use a hybrid of goal-driven reasoning, continuance learning capability and context-based information to drive the next set of sequence of actions.

Figure 4D:
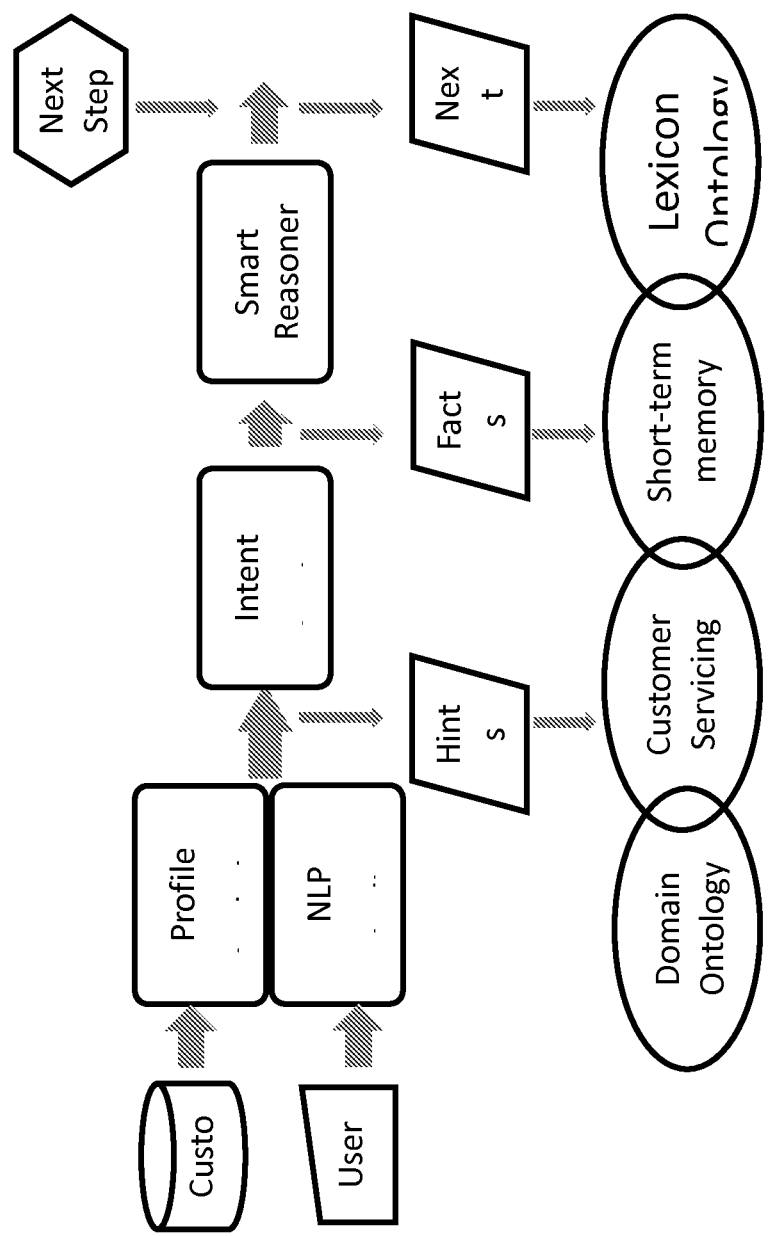

FIG. 4d illustrates possible interactions between the modules and data described herein. Modules in FIG. 4d may include some or all of the following:

The customer service banking ontology module is typically used to capture knowledge about customer service in retail banking and may comprise some or all of: knowledge about financial products, knowledge about customer service issues and potential solutions, short-term memory of the current conversation and lexicon ontology. The ontology is typically used as the foundation to perform different types of reasoning. Typically, the ontology describes some or all of: the concepts in the domain, the relationships between them and constraints. Ontology languages e.g. OWL 2 from the World Wide Web Consortium (W3C) may be employed. OWL 2 makes it possible to describe concepts using such operators as intersection, union, negation; and facilitates derivation of complex concepts from definitions of simpler concepts. Furthermore, the formal ontology (constraints) allows the use of a Reasoner, which may check whether or not all of the statements and definitions in the ontology are mutually consistent and may also recognize which concepts fit under which definitions. This is particularly useful when dealing with cases where classes may have more than one parent.

Domain ontology may include knowledge about financial products e.g. definitions, business terms, fees, product features, etc.

Customer servicing ontology typically stores knowledge about typical customer service issues and potential solutions: main categories, input sources, information required according to certain embodiments, suggested explanations, bank policy.

Short-term memory ontology typically captures information about a party which is currently engaged with the system. When the session starts, the ontology is loaded with knowledge from the historical database including customer profile, activity and service history, so typically, the ontology contains some LTM knowledge. During the conversation, more facts and hints are added, supported by a probability score.

Lexicon ontology typically is a combination of domain-dependent lexicon e.g. obtained through the use of a learning process and generic lexical resources such as but not limited to WordNet.

Different portions of the ontology may be used for different tasks and may be merged into a full ontology e.g. for the use of the Smart Reasoner. In order to coordinate between the different ontology portions, cross ontology classes and relations may be employed for connecting the different portions of the ontology and to facilitate performing advanced reasoning. Example: During a conversation or dialog, hints and facts may be collected as instances of the short-term memory; each hint is assigned classes which are included in the service ontology. If reasonhasFact (short-term memory) and also type merchant (service), then the Reasoner may filter available transactions which contain relevant merchant instances and confirm these transactions with the user.

Ontology maintenance: The system typically employs support for information and knowledge which is bank-specific while creating a methodology and tools for separation between the system's knowledge and that of its banking clients. Typically, a generic ontology is maintained and individual banks update according to specific needs e.g. in the following areas: specific bank-related constraints e.g. "this bank does not support wires from the ATM"; new subclasses e.g. "premium ACH Product", bank instances—fees and waivers for transferring funds.

Some of the bank-specific knowledge may be generated automatically by mining text resources and representing the information held in departmental databases, in terms of the ontology. For example, US banks are required to publish a standard fee schedule which contains information on all fee types and waiver rules.

Figure 4E:
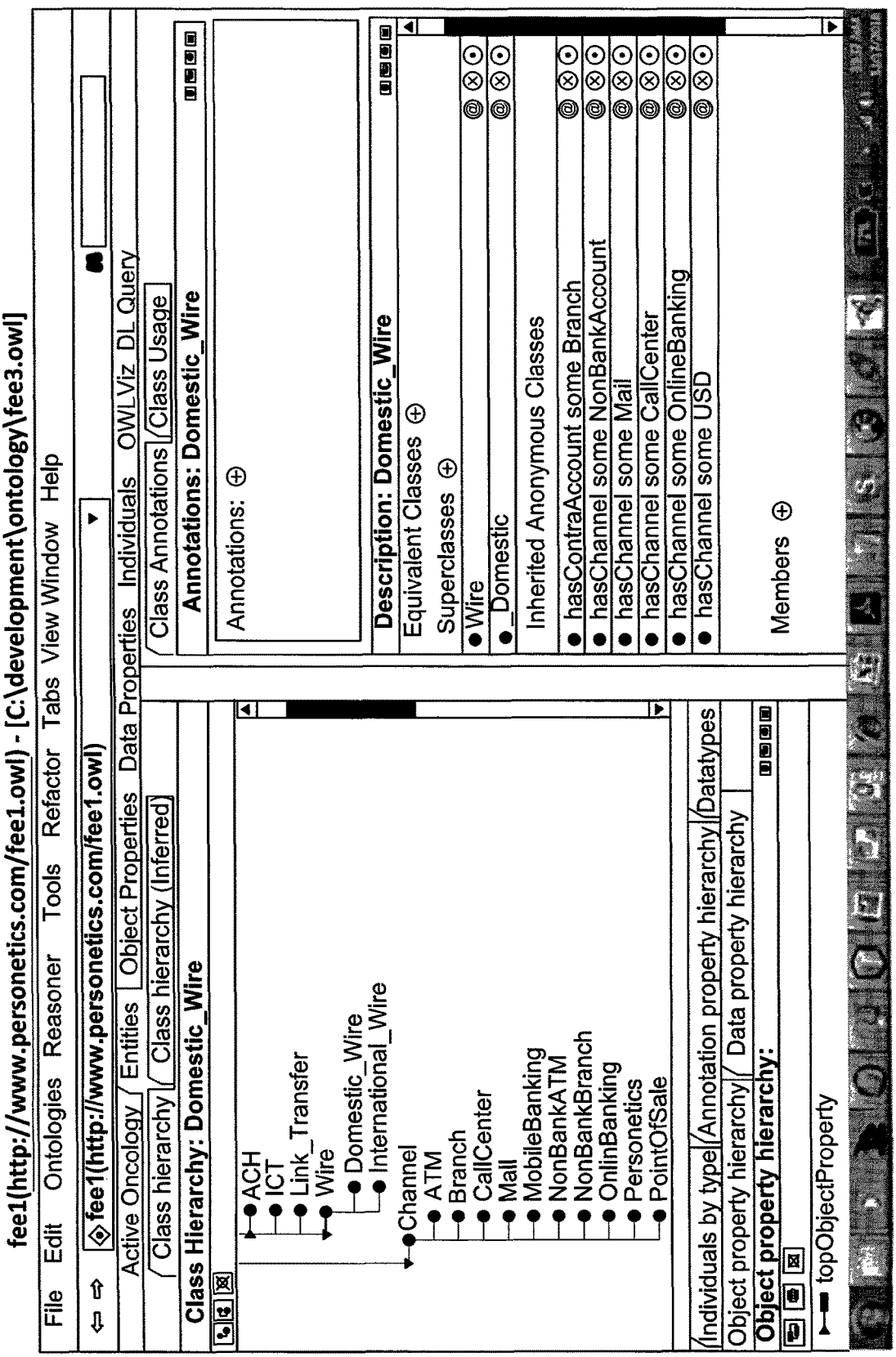
Figure 4F:
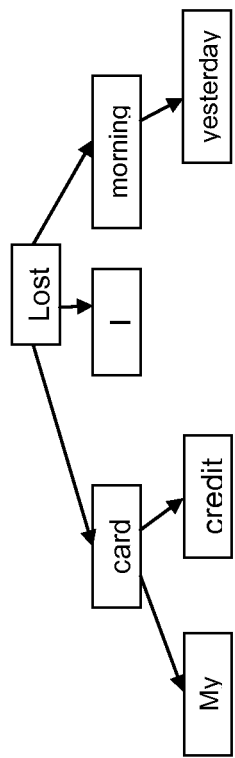

In the example of the screenshot of FIG. 4e, Domestic wire is defined as a subclass part of the transfers hierarchy. Also defined are alternatives and constraints for currency, destinations and available channel types.

An example NLP module is now described. Gate Version 5.2 may be employed as a framework for language processing. Within Gate, an embedded Gate ANNIE system may be utilized for basic information extraction, and Gate plug-ins may be leveraged as a framework for integrating multiple advanced language processing algorithms such as but not limited to Stanford Parser, Open NLP. Using Gate, an NLP pipeline may be created, incorporating key functions such as but not limited to some or all of: tokenization, root, gazetteer, name and entity extraction, part of speech identification, and sentence splitters.

The existing system may be extended with bank-specific entities such as but not limited to financial products, merchants, ATM locations. A probabilistic parser may be used for chunking (e.g. nouns and verbs) and/or to identify grammatical relationships and/or to provide a representation of grammatical relations between words and chunks in a sentence.

An example of NLP module capabilities follows:
Sentence input "I lost my card yesterday morning"
Detected entities: [credit card], [period]
Parser output may be as shown in FIG. 4f.

Suitable conventional means such as WEKA may be employed to develop a classification module which attempts to classify the customer request by different dimensions e.g. some or all of:
Action type
Subject
Source
Negative.

The outcome of the process may be a list of classifiers with confidence scores, as well as entities and specific attributes. Example of key entities extracted may include some or all of:

Merchant class/specific merchant name
Time/date references (exact, relative)
Currency/amount
Geographical location
Card/Account number
Email
Phone
Relations The NLP outputs may be treated as hints which are stored in a short-term memory ontology.

The Profile Analytics of FIG. 4d may be operative to profile multiple dimensions at varying time spans and to compute key indicators. In certain cases profiling is performed at multi-dimensional levels, e.g. device-and-time set, or customer-and-geolocation profiles. Profiling is typically performed at 3 different time-spans: real-time, recent history, and real history. Typically, profiling occurs at some or all of the following key dimensions:

Customer
Household
Customer peer group
Device
Merchant
Geolocation
Time-spot (weekday, evening, etc)
Bank-wide Next, key indicators may be computed from the above profiles. Further enhancement of the key indicators may be achieved by computerized analysis of recent user activity e.g. web-clicks and/or screen content, and providing insight into the customer's current frame of mind, e.g. what bank information the customer is looking at. Key indicators may be created in some or all of the following groups:

Data anomalies
    EXAMPLE: Same amount same date same vendor—TX
    Reason/Category
    TX
Online/mobile context
CRM parameters
    EXAMPLES: Topic of last case; Entity of last case
Velocity
Account profile
Recent customer events
Bank-wide events.

Still referring to FIG. 4d, typically, intent analytics enhances the accuracy of natural language understanding by factoring in specially generated key indicators derived from profiling bank data. The key indicators may then be used to adjust the NLP score and then, typically subsequently, to rank results and convert hints into facts. For example: Customer calls the system regarding a certain issue ("I have a problem using my bank card . . . "); the system finds a declined transaction from the last two hours and hence adds more weight to the declined issues dimension.

Typically, one or both of the following methods are employed for combining the raw NLP features with key indicators, in order to produce the most accurate understanding:

1. Score adjustment: perform probabilistic classification using NLP features, independent of the key indicators, and as a secondary step adjust the confidence scores using heuristics.
2. Single model method: both NLP features as well as key indicators are provided as input into a single scoring model that takes into account both NLP features as well key indicators.

A Score adjustment method is operative even with limited data and is appropriate for incorporating subject matter experts. A single model method produces a single function. However, it may require synchronized data (NLP and key indicators), and it may raise a risk of overweighting the NLP features over the key indicators.

Example: Customer language refers to an unexpected fee. Using profiling, customer history reveals two fees in the customer statement: one of the charges is a "first-time for this customer" whereas the other has been occurring regularly.

Model self trailing: Typically, the system records every classification attempt (conversation of hints to facts) including successful and unsuccessful results. Each attempt is maintained including all hints information and the outcome. The system typically uses the information to constantly adjust its selection and improve its understanding capability.

FIGS. 7a-7d illustrate example fee knowledge sentences which may be used e.g. for customer service or credit card-type dialogs.

The Smart Reasoner is typically operative to evaluate all facts collected and using combined ontology knowledge to derive a decision regarding next steps. The Smart Reasoner typically uses a hybrid of goal-driven reasoning, continuance learning capability and context-based information to drive the next set of sequence of actions. In each step of dialog the Reasoner may evaluate its short-term memory which may include some or all of facts, hints and customer profile, all of which typically include a probability score.

Suitable conventional means e.g. Drools may be used as a foundation, and its capabilities may be enhanced with a set of functions to allow execution of more sophisticated strategies. Drools provides not only rules management but other capabilities like a strong workflow layer, extendibility and integration with Java Objects.

The Smart Reasoner may be extended to include some or all of the following capabilities:

a. Decision using reasoning over the ontology of the present invention. Example: If the short-term memory contains a confirmed subject, then the Reasoner may retrieve a set of available actions which are connected using the relevantAction property. It is assumed that the specific instance actually has a relation which connects potential actions. To execute, a functionality to invoke SPARQL queries may be employed.
b. Decision using generalization: If the Smart Reasoner does not find a direct relation to actions, then the Smart Reasoner may use its capability to ask more generalized questions to retrieve potential solutions. Example: The Reasoner attempts to retrieve a set of available actions which are connected using the relevantAction property but gets nothing. The Reasoner then looks at subject hierarchy (which classes contain this subject) and tries to retrieve available actions. This means that the knowledge may be expressed in general terms and would be relevant to every individual which is included. For example: all issues which are related (part of class statement) may require identification of the trigger.

c. Decision using unsupervised learning: In cases where no actions are identified either using a direct relation or generalization, the Reasoner may attempt to retrieve the set of action by examining confidence of relations which are captured using past experience. Each relation represents a connection between a set of variables and relevant action. Using the generalization service, the relations may be aggregated to represent strong and weak relationships (e.g. probability based).

Examining more generalized historical relations typically highlights the "correct" associations, those whose "noise" has faded beyond some detection threshold.

This allows the system to constantly improve its accuracy but also generate actions for new instances based on selections of relevant historical relations, assuming it is possible to find enough relations when applying generalization.

Manual Escalation: The Reasoner typically has a failsafe mechanism which escalates to a human advisor as per predefined criteria of need for human intervention. When none of the automated functions produce any meaningful actions, the system may perform an escalation e.g. to the human advisor.

FIG. 4g is a table useful in understanding the dialog manager shown and described herein.

Dialog may be conducted between a server implementing some or all of the functionalities shown and described herein and a mobile communication device serving a user who is a client for the server and a customer of a computerized enterprise providing data either directly to the server or to the public, such that data may be captured by the server, without cooperation with the enterprise. The term "mobile communication device" as used herein is intended to include but not be limited to any of the following: mobile telephone, smart phone, playstation, iPad, TV, remote desktop computer, game console, tablet, mobile e.g. laptop or other computer terminal, embedded remote unit. The system may be implemented as a web-based system including suitable software, computers, routers and telecommunications equipment.

The methods shown and described herein are particularly useful in serving hundreds, thousands, tens of thousands, or hundreds of thousands of users each generating hundreds or thousands of transactions or more vis á vis the computerized enterprise. This is because practically speaking, such large bodies of knowledge can only be processed for dialog enhancement as described herein using computerized technology.

It is appreciated that terminology such as "mandatory", "required", "need" and "must" refer to implementation choices made within the context of a particular implementation or application described herewithin for clarity and are not intended to be limiting since in an alternative implementation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer-useable medium having computer-readable program code, such as executable code, having embodied therein, and/or including computer-readable program code for performing any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally including at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are if they so desire able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client-centered "view", or "view" from any other node of the system, of the entire functionality of the system, computer-readable medium, apparatus, including only those functionalities performed at that server or client or node.

Conversely, features of the invention, including method steps, which are described for brevity in the context of a single embodiment or in a certain order, may be provided separately or in any suitable subcombination or in a different order. The term "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A data gathering system, the system comprising:
   a virtual robot, including an automated chat system, operative to generate a dialog with a customer, via her or his mobile communication device, the robot being operative to employ external data from an enterprise systems to answer questions;
   a data-aware knowledge base storing, in a machine-readable memory, knowledge on relative costs of obtaining various data items; and
   a data retrieval decision-making processor operative, when an individual data element is sought to be retrieved by the virtual robot, to determine whether or not to retrieve said data element by comparing at least one parameter comprising a utility value representing a need for said data element with at least one parameter, retrieved from said data-aware knowledge base, which represents a relative cost of obtaining said data element,
   wherein said data retrieval decision-making processor is configured to perform a reasoning process operative, given potential execution paths in a backward-chaining based expert system, to work from a set of desired goals, backward to dependent data items required to attain the goals, and
   wherein said items include at least one of: data retrieval from a computerized external information system, user dialog items which include posing direct questions to the user, and data processing only with no data retrieval,
   wherein said utility value and a cost at each processing iteration are used to assess a cost-effectiveness of parameter links and a most cost-effective next item to resolve is found by optimization, and
   wherein cost-effectiveness scores of the parameter links are reduced as an increasing function of the distance of the cost-effectiveness scores from a goal item to reflect said reasoning process's backward-chaining nature,
   thereby to provide a virtual robot configured for accessing the enterprise systems only when needed using a knowledge representation of data and reasoning process which compute the necessity and cost for retrieving a certain data element.

2. A system according to claim 1 wherein said knowledge base includes a hierarchy of costs wherein data which can be obtained without engaging either the user or an enterprise system serving the user is assigned a relatively low cost, data which is obtained by engaging the enterprise system is assigned a medium cost which exceeds said relatively low cost, and data which is obtained by engaging the user is assigned a high cost which exceeds said medium cost.

3. A system according to claim 1 which imitates human agent activity by accessing the systems only when needed using a knowledge representation of data and reasoning process.

4. A system according to claim 3 wherein said system computes the necessity and/or cost for retrieving at least one data element.

5. A system according to claim 3 wherein said system computes the cost for retrieving at least one data element.

6. A system according to claim 3 wherein the system takes into account that direct user questions and information gathering delays have an experiential impact on a human user's experience, and selects an execution path accordingly.

7. A system according to claim 1 wherein said parameter representing need for said data element comprises a utility value.

8. A system according to claim 1 wherein the data retrieval decision-making processor is operative for computing cost-effectiveness scores for at least one parameter link.

9. A system according to claim 8 wherein negative cost-effectiveness scores are avoided and a Dijkstra-based search algorithm is used.

10. A system according to claim 8 wherein negative cost-effectiveness scores are avoided to enable spectral graph analysis.

11. A system according to claim 1 wherein said reasoning process is operative, at least once, given potential execution paths in a backward-chaining based expert system, to work from a set of desired goals, backward to dependent data items required to attain the goals, said items including data retrieval from a computerized external information system.

12. A system according to claim 1 wherein said reasoning process is operative, at least once, given potential execution paths in a backward-chaining based expert system, to work from a set of desired goals, backward to dependent data items required to attain the goals, said items including user dialog items which include posing direct questions to the user.

13. A data gathering method comprising:
    reducing up-front data retrieval without embedding on-demand data collection into a reasoning process since due to large data sets and slow information systems, on-demand retrieval may have a negative effect on user experience as the user has to wait for new data to arrive, said reducing comprising:
        storing, in a machine-readable memory, knowledge on relative costs of obtaining various data items, to generate a data-aware knowledge base; and
        when an individual data element is sought to be retrieved, determining whether or not to retrieve said data element by comparing at least one parameter representing a need for said data element with at least one parameter, retrieved from said data-aware knowledge base, which represents a relative cost of obtaining said data element, wherein said determining is performed by a data retrieval decision-making processor operative, given potential execution paths in a backward-chaining based expert system, to work from a set of desired goals, backward to identify dependent data items required to attain the goals, and wherein said items include at least one of: data retrieval from a computerized external information system, user dialog items which include posing direct questions to the user, and data processing only with no data retrieval, wherein the method further comprises identifying goals of the set of desired goals to serve as a basis for a shortest path tree search which returns a single-source shortest path for a graph with non-negative edge path costs, and computing a current cost of identified items based on at least execution timing and determining a utility of at least one item parameter according to current data availability.

14. A method according to claim 13 and also comprising:
playing back human-generated queries previously executed in real-time and recorded, capturing additional information from said queries, and using said additional information to facilitate said determining.

15. A method according to claim 13 further comprising:
generating a topological representation of possible paths leading to at least one goal of the set of desired goals, wherein each path includes a sequence of nodes and each node is defined as including or not including data retrieval from an external source; and using the topological representation to optimize dialog between a computerized system and a human user including selecting paths which reduce interaction with at least one computerized enterprise serving as an external source of data.

16. A method according to claim 13 further comprising:
generating a Laplacian matrix representation of a directed graph; and examining the graph's spectral decomposition including identifying a most cost-effective item which corresponds to a smallest non-zero matrix eigenvalue.

17. A method according to claim 13 wherein queries' execution durations are statistically analyzed to gradually learn average execution duration.

18. A method according to claim 13 wherein said data retrieval decision-making processor is operative, at least once, given potential execution paths in a backward-chaining based expert system, to work from a set of desired goals, backward to identify dependent data items required to attain the goals, said items including data retrieval from a computerized external information system.

19. A computer program product, comprising a non-transitory tangible computer-readable medium having computer-readable program code embodied therein, said computer-readable program code adapted to be executed to implement a data gathering method comprising:

storing in machine-readable memory, knowledge on relative costs of obtaining various data items, to generate a data-aware knowledge base; and when an individual data element is sought to be retrieved, determining whether or not to retrieve said data element by comparing at least one parameter representing a need for said data element with at least one parameter, retrieved from said data-aware knowledge base, which represents a relative cost of obtaining said data element, wherein said determining is performed by a data retrieval decision-making processor operative, given potential execution paths in a backward-chaining based expert system, to work from a set of desired goals, backward to identify dependent data items required to attain the goals, and wherein said items include at least one of: data retrieval from a computerized external information system, user dialog items which include posing direct questions to the user, and data processing only with no data retrieval, wherein the method further comprises computing a current cost of the identified items based on at least execution timing and determining a most cost-effective next item to resolve by optimization; and locating and using a most cost-effective edge with a distance no larger than N item reference steps from a goal item as an approximation of optimal next item selection.

20. A computer program product according to claim 19 wherein said data retrieval decision-making processor is operative, at least once, given potential execution paths in a backward-chaining based expert system, to work from a set of desired goals, backward to identify dependent data items required to attain the goals, said items including data retrieval from a computerized external information system.

* * * * *

UNITED STATES PATENT AND TRADEMARK OFFICE
CERTIFICATE OF CORRECTION

PATENT NO. : 10,387,536 B2  
APPLICATION NO. : 14/345797  
DATED : August 20, 2019  
INVENTOR(S) : David D. Govrin et al.

It is certified that error appears in the above-identified patent and that said Letters Patent is hereby corrected as shown below:

On the Title Page

Item (73), should read:
PERSONETICS TECHNOLOGIES LTD., Tel Aviv (IL)

Signed and Sealed this  
Thirty-first Day of March, 2020

Andrei Iancu  
*Director of the United States Patent and Trademark Office*